United States Patent [19]

Yoshida et al.

[11] Patent Number: 5,750,781
[45] Date of Patent: May 12, 1998

[54] PROCESS FOR PREPARING AN AQUEOUS COPOLYMER SOLUTION

[75] Inventors: Yoshifumi Yoshida, Hyogo; Akira Tanigawa; Satoshi Yamamoto, both of Osaka, all of Japan

[73] Assignee: Sumitomo Chemical Company, Limited, Osaka, Japan

[21] Appl. No.: 485,143

[22] Filed: Jun. 7, 1995

[30] Foreign Application Priority Data

Jun. 20, 1994 [JP] Japan .................. 6-137047

[51] Int. Cl.⁶ .................................. C07C 231/12
[52] U.S. Cl. ................. 564/153; 210/708; 252/341; 252/344; 562/565
[58] Field of Search .................. 252/344, 341; 210/708; 562/565; 564/153

[56] References Cited

U.S. PATENT DOCUMENTS

| 3,316,181 | 4/1967 | Sackis | 252/341 |
| 3,585,148 | 6/1971 | Sackis | 252/344 |

FOREIGN PATENT DOCUMENTS

| 0320512 | 4/1991 | European Pat. Off. |
| 4203818 | 8/1992 | Germany. |

OTHER PUBLICATIONS

Chemical Abstracts, vol. 110, No. 14, Apr. 3, 1989.

*Primary Examiner*—Peter O'Sullivan
*Attorney, Agent, or Firm*—Sughrue, Mion, Zinn, Macpeak & Seas, PLLC

[57] ABSTRACT

A process for preparing an aqueous solution of an ionic copolymer having a copolymer concentration of 20 % by weight or less and a viscosity of 20 ps or more at 25° C. which comprises conducting copolymerization of an acrylamide compound(B) with a diallylamine compound(A) by continuously adding an aqueous solution of (B) having a concentration of 30% by weight or less to an aqueous solution of the diallylamine compound(A) having a concentration of 5% by weight or more and less than 10% by weight, and this process exhibit high conversion of diallylamine compounds, of which reactivity is low, and a copolymer having a high molecular weight can be obtained.

5 Claims, No Drawings

PROCESS FOR PREPARING AN AQUEOUS COPOLYMER SOLUTION

BACKGROUND OF THE INVENTION

The present invention is related to a process for preparing an aqueous solution of an ionic copolymer which comprises conducting a copolymerization of an acrylamide compound with a diallylamine compound, and optionally an α, β-unsaturated carboxylic acid, in an aqueous reaction solution.

Diallylamine compounds can be subjected to cyclization and give polymers having a cyclic structure. However, because diallylamine compounds have allyl groups in their molecular structure, they easily cause allylic degradative chain transfer and, as a result, their polymerization activities are not sufficiently high. This drawback is more conspicuous when diallylamine compounds are subjected to copolymerization with other monomers. J. Polym. Sci.; Poly. Chem. Ed. 24, 29–36 (1986) mentions that monomer reactivity ratio of diallyl dimethyl ammonium chloride(=DADMAC, $M_1$) and acrylamide($M_2$) is $r_1=0.58$ and $r_2=6.7$, respectively, in their copolymerization, i.e. reactivity of DADMAC is conspicuously low compared to reactivity of acrylamide.

Due to low reactivity of diallylamine compounds, in copolymerization of diallylamine compounds with acrylamide compounds, and optionally α, β-unsaturated carboxylic acids, polymerization of acrylamide compounds or α, β-unsaturated carboxylic acids takes precedence over polymerization of diallylamine and, as a result, a large amount of unreacted diallylamine monomer remains in the resulting product.

By adding polymerization initiator successively, the amount of unreacted diallylamine can be reduced but, according to this method, only a polymer having a low molecular weight can be obtained and, in an extreme case, the polymer chain is decomposed.

As an improved method, JP-A-88-225608 discloses a method in which an acrylamide compound is added continuously to an aqueous solution containing a diallylamine compound. However, even according to this improved method, using some of monomers or taking some reaction conditions, sufficient results are not always obtained. This improved method has difficulties, particularly, when the ratio of diallylamine compound in the monomers to be reacted is relatively high, and when the aim is a polymer of high molecular weight, i.e. a polymer which gives a copolymer aqueous solution having high viscosity even at a low concentration.

The inventors of the present invention have conducted extensive studies to develop a process for preparing a copolymer of diallylamine compounds and acrylamide compounds which overcomes the above mentioned problems, i.e. low reactivity of diallylamine compounds, and can attain a high conversion of diallylamine compounds even when the ratio of diallylamine compound in the monomers is relatively high and when the aim is a polymer of high molecular weight. As the result, the inventors have found that the above mentioned object can be attained by continuously adding an aqueous solution of an acrylamide compound having a concentration lower than a specific concentration to an aqueous solution containing a diallylamine compound at a specific concentration.

SUMMARY OF THE INVENTION

The present invention provides a process for preparing an aqueous solution of an ionic copolymer having a concentration of 20% by weight or less and a viscosity of 20 ps or more at 25° C., which comprises; conducting copolymerization of a diallylamine compound(A) represented by the following formula (I):

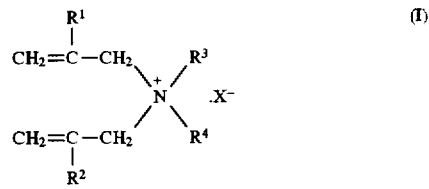

wherein $R^1$ and $R^2$ each independently represents hydrogen or methyl, $R^3$ and $R^4$ each independently represents hydrogen or alkyl having 1–6 carbon atoms, and $X^-$ is an acid anion, and an acrylamide compound(B) represented by the following formula (II):

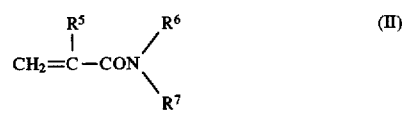

wherein $R^5$ represents hydrogen or methyl, and $R^6$ and $R^7$ each independently represent hydrogen or alkyl having 1–4 carbon atoms, by continuously adding an aqueous solution of the acrylamide compound(B) having a concentration of the acrylamide compound(B) of 30% by weight or less to an aqueous solution of the diallylamine compound(A) having a concentration of the diallylamine compound(A) of 5% by weight or more and less than 10% by weight.

In the reaction above, carboxylic acid compounds(C) such as α, β-unsaturated monocarboxylic acid and α, β-unsaturated dicarboxylic acid can be used as a monomer in addition to (A) and (B). In this case, i.e., using (C) as an monomer, (C) is also added continuously to a solution containing the diallylamine compound(A).

DETAILED DESCRIPTION OF THE INVENTION

The diallylamine compound(A) which is used as a starting material in the present invention is a secondary amine salt, a tertiary amine salt or a quaternary ammonium salt. As the alkyl denoted by $R^3$ and $R^4$ in formula (I), for examples, methyl, ethyl, propyl, butyl and hexyl can be mentioned. The anion denoted by $X^-$ may be an anion of either an inorganic acid or organic acid. Examples of the inorganic acid include hydrochloric acid, hydrobromic acid, sulfuric acid, phosphoric acid and nitric acid, and examples of the organic acid include formic acid, acetic acid, oxalic acid and propionic acid. That is, examples of $X^-$ include chloro anion, bromo anion, sulfuric anion, phosphoric anion, nitric anion, formic anion, acetic anion, oxalic anion and propionic anion.

As examples of secondary amine salts of diallylamine compound(A), inorganic acid salts and organic acid salts of diallylamine, and inorganic acid salts and organic acid salts of dimethallylamine can be mentioned. As examples of tertiary amine salts of diallylamine compound(A), inorganic acid salts and organic acid salts of compounds such as diallylmethylamine, diallylethylamine and diallylbutylamine can be mentioned.

As examples of quaternary ammonium salts of diallylamine compound(A), diallyldimethylammonium chloride, diallyldimethylammonium bromide, diallyldimethylammonium sulfate, diallyldiethylammonium chloride, diallyldibutylammonium chloride and diallylmethylethylammonium chloride can be mentioned. These diallylamine compounds (A) can be used singly or in combination of two or more thereof.

The alkyl denoted by $R^6$ and $R^7$ in formula (II) includes methyl, ethyl, propyl and butyl. Examples of the acrylamide compounds(B) include acrylamide, methacrylamide, N-methylacrylamide, N-ethylacrylamide, N-propylacrylamide, N-isopropylacrylamide, N-butylacrylamide and N,N-dimethylacrylamide. These acrylamide compounds(B) can be used singly or in combination of two or more thereof.

Through copolymerization of (A) and (B), a cationic copolymer is obtained.

Examples of the carboxylic acid compounds(C), which are optionally copolymerized with (A) and (B), include unsaturated monocarboxylic acid such as acrylic acid and methacrylic acid; and unsaturated dicarboxylic acid such as maleic acid, fumaric acid and itaconic acid.

The carboxylic acid compounds(C) also include salts of unsaturated carboxylic acid compounds. As examples of the salts, alkali metal salts such as sodium salt and potassium salt, and ammonium salts can be mentioned. Through copolymerization of (A), (B) and (C), an amphoteric copolymer is obtained. These carboxylic acid compounds(C) can be used singly or in combination of two or more thereof.

In the process of the present invention, the amount of (A) is preferably 1–70% by mole, more preferably 5–50% by mole, particularly preferably 10–35% by mole; and the amount of (B) is preferably 30–99% by mole, more preferably 50–95% by mole, particularly preferably 65–90% by mole; based on the total molar amount of the monomers used in the process. In a case when (C) is used, the amount of (C) is preferably not more than 20% by mole based on the total molar amount of the monomers used in the process.

In a process of the present invention, a monomer(D), other than (A), (B) and optionally (C), which can copolymerize with (A), (B) or (C), can be used as a starting monomer in addition. As examples of the monomers(D), which is copolymerized with (A) and (B), or (A), (B) and (C), a nonionic monomer such as acrylonitrile, methacrylonitrile, methyl acrylate, methyl methacrylate, hydroxyethyl acrylate, hydroxyethyl methacrylate, styrene and vinyl acetate; a cationic monomer such as dimethyl aminoethylacrylate, dimethyl aminoethyl methacrylate, dimethyl aminopropylacrylate, dimethyl aminopropyl methacrylate and quaternized compounds thereof; and a bifunctional monomer such as ethyleneglycol diacrylate, ethyleneglycol dimethacrylate, methylene bisacrylamide and methylenebis methacrylamide can be mentioned.

The copolymerization in the process of the present invention is preferably conducted by using a polymerization initiator. A polymerization initiator conventionally used can be used for the copolymerization of the present invention. Examples of the polymerization initiator include persulfates such as ammonium persulfate and potassium persulfates; azo compounds such as 2,2'-diamidino-2,2'-azodipropane dihydrochloride and azobisisobutyronitrile; and peroxides such as di-t-butyl peroxide, cumenehydro peroxide and hydrogen peroxide. Known Redox initiators such as a combination of potassium persulfates and sodium bisulfide or a tertially amine can also be used. The amount of the polymerization initiator is preferably 0.01% by mole or more, more preferably 0.05% by mole or more, based on the total molar amount of the monomers used in this process.

In the copolymerization in the process of the present invention, a known polymerization regulator can be used to regulate the molecular weight of the copolymer. As examples of the polymerization regulator usable in the present invention, alcohols such as isopropanol, thiol such as butylmercaptan and phosphorus compounds such as hydrophosphite can be mentioned. As scavengers for transition metals which often exist in the reaction system, a chelating agent such as ethylenediaminetetraacetic acid and an alkali metal salt thereof can be used.

The copolymerization is usually conducted at a temperature of 10°–100° C., preferably 40°–90° C., for 1–15 hours. The polymerization can be conducted in the presence of oxygen, but is preferably conducted under an atmosphere of inert gas such as nitrogen gas.

To conduct the copolymerization in the process of the present invention, an aqueous solution containing an acrylamide compound(B) at a concentration of not more than 30% by weight is added continuously to an aqueous solution containing a diallylamine compound(A) at a concentration of 5% by weight or more and less than 10% by weight, which was prepared beforehand. Carboxylic acid compound (C) may be added continuously together with (B), in a case when (C) is used. In the copolymerizations mentioned above, the concentration of the solution of acrylamide compounds (B) may be more than 30% by weight, provided that water or a dilute aqueous solution is added at the same time as the addition of (B) so as to make the theoretical concentration of the theoretical mixture of the acrylamide compound solution and the water or dilute aqueous solution 30% by weight or less. For example, a 50% by weight aqueous solution of acrylamide compound(B) can be added if the same amount of water is added simultaneously. (In this case, the theoretical concentration is 25% by weight.)

The concentration of the aqueous solution containing a diallylamine compound(A) is 5% by weight or more and less than 10% by weight, preferably 5%–9%.

(B), and (C) if used, may be added continuously either at a uniform or an nonuniform adding rate. The addition time of (B), and (C) if used, is usually from 30 minutes to 1 hour.

In a case when (C) is added, (B) and (C) may be added independently or may be added as a mixture of (B) and (C). Carboxylic acid compound(C) may be added, for example, as a solid form but, usually, it is added as an aqueous solution thereof.

As long as the objects of the present invention are achieved, a part of (B) and/or (C) may be added to the reaction system before the initiation of the copolymerization. If a monomer(D) copolymerizable with (A), (B) or (C) is used in addition, (D) may be added independently or as a mixture with (B) and/or (C). A part of (D) may be added to the reaction system before the initiation of the copolymerization.

In a case when auxiliary agents such as a polymerization initiator, polymerization regulator and chelating agent are used, they may be added to the reaction system before the initiation of the copolymerization or may be added continuously at the same time as addition of (B) and/or (C). In a case when two or more kinds of auxiliary agents are used, all of them may be added in the same way or each of them may be added in a different way.

EXAMPLES

The present invention is further explained in more detail with reference to the following Examples which should not be construed to limit this invention. In the Examples, "%" means "% by weight", unless otherwise mentioned. In the Examples, amounts of unreacted monomer were measured by gas chromatography or liquid chromatography. Viscosity was measured with a BL type viscometer. Viscosity and pH were measured at 25° C.

Example 1

Into a four necked flask equipped with a thermometer, a stirring rod and a reflux condenser, 50.1 g (0.15 mole) of 40% aqueous solution of diallylamine hydrochloric acid salt and 166 g of ion exchanged water were charged and the pH was adjusted to 3.5 with hydrochloric acid. Thereafter, the inner part of the flask was purged of air with nitrogen gas and the inner temperature was elevated to 60° C. After 410 mg of potassium persulfate was added thereto, 82.9 g (0.35 mole) of 30% aqueous acrylamide solution was added dropwise to the reaction system over 3 hours while keeping the inner temperature at 60°–70° C. Thereafter, the inner temperature was kept at 60°–70° C. for 5 hours to complete the reaction.

Calculated from the measured quantity of unreacted monomers, the conversion of diallylamine hydrochloric acid was 91% and the conversion of acrylamide was not less than 99%. The obtained product is a 15% aqueous polymer solution having a pH of 3.3 and a viscosity of 21 ps.

Example 2

Into the same flask as in Example 1, 26.9 g (0.1 mole) of 60% aqueous solution of diallyldimethylammonium chloride and 143 g of ion exchanged water were charged and the pH was adjusted to 4.0 with hydrochloric acid. Thereafter, the inner part of the flask was purged of air with nitrogen gas and the inner temperature was elevated to 60° C. After 570 mg of ammonium persulfate was added thereto, 56.9 g (0.4 mole) of 50% aqueous acrylamide solution and 70 g of a 0.05% aqueous solution of sodium hydrophosphite were added dropwise to the reaction system over 4 hours while keeping the inner temperature at 60°–70° C. Thereafter, the inner temperature was kept at 55°–65° C. for 5 hours to complete the reaction.

Calculated from the measured quantity of unreacted monomers, the conversion of diallyldimethylammonium chloride was 98% and the conversion of acrylamide was not less than 99%. The obtained product is a 15% aqueous polymer solution having a pH of 3.4 and a viscosity of 36 ps.

Example 3

Into the same flask as in Example 1, 36.5 g (0.1 mole) of 40% aqueous solution of diallylamine sulfuric acid salt and 137 g of ion exchanged water were charged and the pH was adjusted to 3.0 with sulfuric acid. Thereafter, the inner part of the flask was purged of air with nitrogen gas and the inner temperature was elevated to 60° C. After 340 mg of ammonium persulfate was added thereto, 56.9 g (0.4 mole) of 50% aqueous acrylamide solution and 57 g of water were added dropwise to the reaction system over 5 hours while keeping the inner temperature at 60°–70° C. Thereafter, the inner temperature was kept at 60°–70° C. for 6 hours to complete the reaction.

Calculated from the measured quantity of unreacted monomers, the conversion of diallylamine sulfuric acid salt was 93% and the conversion of acrylamide was not less than 99%. The obtained product is a 15% aqueous polymer solution having a pH of 3.1 and a viscosity of 32 ps.

Example 4

Into the same flask as in Example 1, 30.1 g (0.09 mole) of 40% aqueous solution of diallylamine hydrochloric acid salt and 103 g of ion exchanged water were charged and the pH was adjusted to 4.0 with hydrochloric acid. Thereafter, the inner part of the flask was purged of air with nitrogen gas and the inner temperature was elevated to 60° C. After 240 mg of potassium persulfate was added thereto, a solution prepared previously by dissolving 28.4 g (0.4 mole) of acrylamide and 0.9 g (0.01 mole) of methacrylic acid into 167 g of water was added dropwise to the reaction system over 5 hours while keeping the inner temperature at 60°–70° C. Thereafter, the inner temperature was kept at 60°–70° C. for 5 hours to complete the reaction.

Calculated from the measured quantity of unreacted monomers, the conversion of diallylamine hydrochloric acid salt was 93% and the conversions of methacrylic acid and acrylamide were not less than 99%. The obtained product is a 12.5% aqueous polymer solution having a pH of 3.2 and a viscosity of 23 ps.

Example 5

Into the same flask as in Example 1, 26.9 g (0.1 mole) of 60% aqueous solution of diallyldimethylammonium chloride and 142 g of ion exchanged water were charged and the pH was adjusted to 4.0 with hydrochloric acid. Thereafter, the inner part of the flask was purged of air with nitrogen gas and the inner temperature was elevated to 60° C. After 410 mg of potassium persulfate was added thereto, a solution prepared previously by dissolving 23.1 g (0.325 mole) of acrylamide and 5.3 g (0.075 mole) of acrylic acid into 57 g of water was added dropwise to the reaction system over 3 hours while keeping the inner temperature at 60°–70° C. Thereafter, the inner temperature was kept at 60°–70° C. for 6 hours to complete the reaction.

Calculated from the measured quantity of unreacted monomers, the conversion of diallyldimethylammonium chloride was 97% and the conversions of acrylic acid and acrylamide were not less than 99%. The obtained product is a 17.5% aqueous polymer solution having a pH of 3.2 and a viscosity of 68 ps.

Comparative example 1

Into the same flask as in Example 1, 26.9 g (0.1 mole) of 60% aqueous solution of diallyldimethylammonium chloride and 199 g of ion exchanged water were charged and the pH was adjusted to 4.0 with hydrochloric acid. Thereafter, 28.4 g (0.4 mole) of acrylamide was added thereto. Then, the inner part of the flask was purged of air with nitrogen gas and the inner temperature was elevated to 60° C. After 570 mg of ammonium persulfate was added thereto, the inner temperature was kept at 60°–70° C. for 6 hours to complete the reaction.

Calculated from the measured quantity of unreacted monomers, the conversion of diallyldimethylammonium chloride was 64% and the conversion of acrylamide was 94%. The obtained product is a 17.5% aqueous polymer solution having a pH of 3.2 and a viscosity of 22 ps.

Comparative example 2

Into the same flask as in Example 1, 50.1 g (0.15 mole) of 40% aqueous solution of diallylamine hydrochloric acid salt and 200 g of ion exchanged water were charged and the pH was adjusted to 3.5 with hydrochloric acid. Thereafter, the inner part of the flask was purged of air with nitrogen gas and the inner temperature was elevated to 60° C. After 410 mg of potassium persulfate was added thereto, 49.8 g (0.35 mole) of 50% aqueous acrylamide solution was added dropwise to the reaction system over 5 hours while keeping the inner temperature at 60°–70° C. Thereafter, the inner temperature was kept at 60°–70° C. for 6 hours to complete the reaction.

Calculated from the measured quantity of unreacted monomers, the conversion of diallylamine hydrochloric acid salt was 81% and the conversion of acrylamide was not less than 99%. The obtained product is a 15% aqueous polymer solution having a pH of 3.1 and a viscosity of 24 ps.

The conditions of the Examples and Comparative examples are shown in Table 1 and the results of the Examples and Comparative examples are shown in Table 2. In the Tables, following abbreviations are used:

A: Diallylamine compounds
DADMAC: Diallyldimethylammoniumchloride
DAAC: Diallylamine hydrochloric acid salt
DAAS: Diallylamine sulfuric acid salt
B: Acrylamide compounds
AAm: Acrylamide
C: Carboxylic acid compounds
MA: Methacrylic acid
AA: Acrylic acid

TABLE 1

|  | Kinds of Used monomers (mole ratio %) | | | Concentration of the aqueous solution (%) | |
|---|---|---|---|---|---|
|  | A | B | C | A | B |
| Example 1 | DAAC 30 | AAm 70 | — | 9.3 | 30.0 |
| Example 2 | DADMAC 20 | AAm 80 | — | 9.5 | 22.4 |
| Example 3 | DAAS 20 | AAm 80 | — | 8.4 | 25.0 |
| Example 4 | DAAC 18 | AAm 80 | MA 2 | 9.0 | 14.5 |
| Example 5 | DADMAC 20 | AAm 65 | AA 15 | 9.6 | 27.0 |
| Comparative Example 1 | DADMAC 20 | AAm 80 | — | — | — |
| Comparative Example 2 | DAAC 30 | AAm 70 | — | 8.0 | 50.0 |

TABLE 2

|  | Obtained product | | Reaction ratio of Monomer (%) | | |
|---|---|---|---|---|---|
|  | Concentration (%) | Viscosity ps | A | B | C |
| Example 1 | 15 | 21 | 91 | ≧99 | — |
| Example 2 | 15 | 36 | 98 | ≧99 | — |
| Example 3 | 15 | 32 | 93 | ≧99 | — |
| Example 4 | 12.5 | 23 | 93 | ≧99 | ≧99 |
| Example 5 | 17.5 | 68 | 97 | ≧99 | ≧99 |
| Comparative example 1 | 17.5 | 22 | 64 | 94 | — |
| Comparative example 2 | 15 | 24 | 81 | ≧99 | — |

In producing a copolymer of diallylamine compounds and acrylamide compounds, conversion of diallylamine compounds, of which reactivity is low, can be improved and a copolymer having a high molecular weight can be obtained, i.e., an aqueous solution of the copolymer having high viscosity in a low concentration can be obtained, by the process of the present invention. Accordingly, the process of the present invention is an advantageous process for producing the copolymer.

What we claim is:

1. A process for preparing an aqueous solution of an ionic copolymer having a copolymer concentration of 20% by weight or less and a viscosity of 20 ps or more at 25° C., which comprises:

conducting copolymerization of a diallylamine compound (A) represented by the following formula (I):

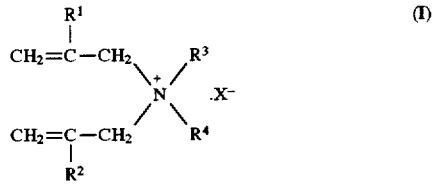

wherein $R^1$ and $R^2$ each independently represents hydrogen or a methyl group, $R^3$ and $R^4$ each independently represents hydrogen or an alkyl group having 1–6 carbon atoms, and $X^-$ is an acid anion, and an acrylamide compound (B) represented by the following formula (II):

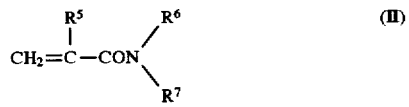

wherein $R^5$ represents hydrogen or a methyl group, and $R^6$ and $R^7$ each independently represents hydrogen or an alkyl group having 1–4 carbon atoms, by continuously adding an aqueous solution of the acrylamide compound (B) having a concentration of the acrylamide compound (B) of 30% by weight or less to an aqueous solution of diallylamine compound (A) having a concentration of the diallylamine compound (A) of 5% by weight or more and less than 10% by weight.

2. A process according to claim 1, wherein the amount of diallylamine compound (A) is 1–70% by mole and the amount of acrylamide compound (B) is 30–99% by mole based on the total molar amount of the monomers (A) and (B).

3. A process according to claim 1 wherein the amount of diallylamine compound (A) is 10–35% by mole and the amount of acrylamide compound (B) is 65–90% by mole based on the total molar amount of the monomers (A) and (B).

4. A process according to claim 1 wherein a carboxylic compound (C) selected from the group consisting of an α, β-unsaturated monocarboxylic acid and an α, β-unsaturated dicarboxylic acid is also added continuously to the solution containing the diallylamine compound (A).

5. A process according to claim 4 wherein the amount of carboxylic acid compound (C) is not more than 20 % by mole based on the total molar amount of the monomers (A), (B) and (C).

* * * * *